(No Model.)
C. B. PETERSEN.
APPARATUS FOR PASTEURIZING AND COOLING CREAM OR MILK.
No. 558,980. Patented Apr. 28, 1896.
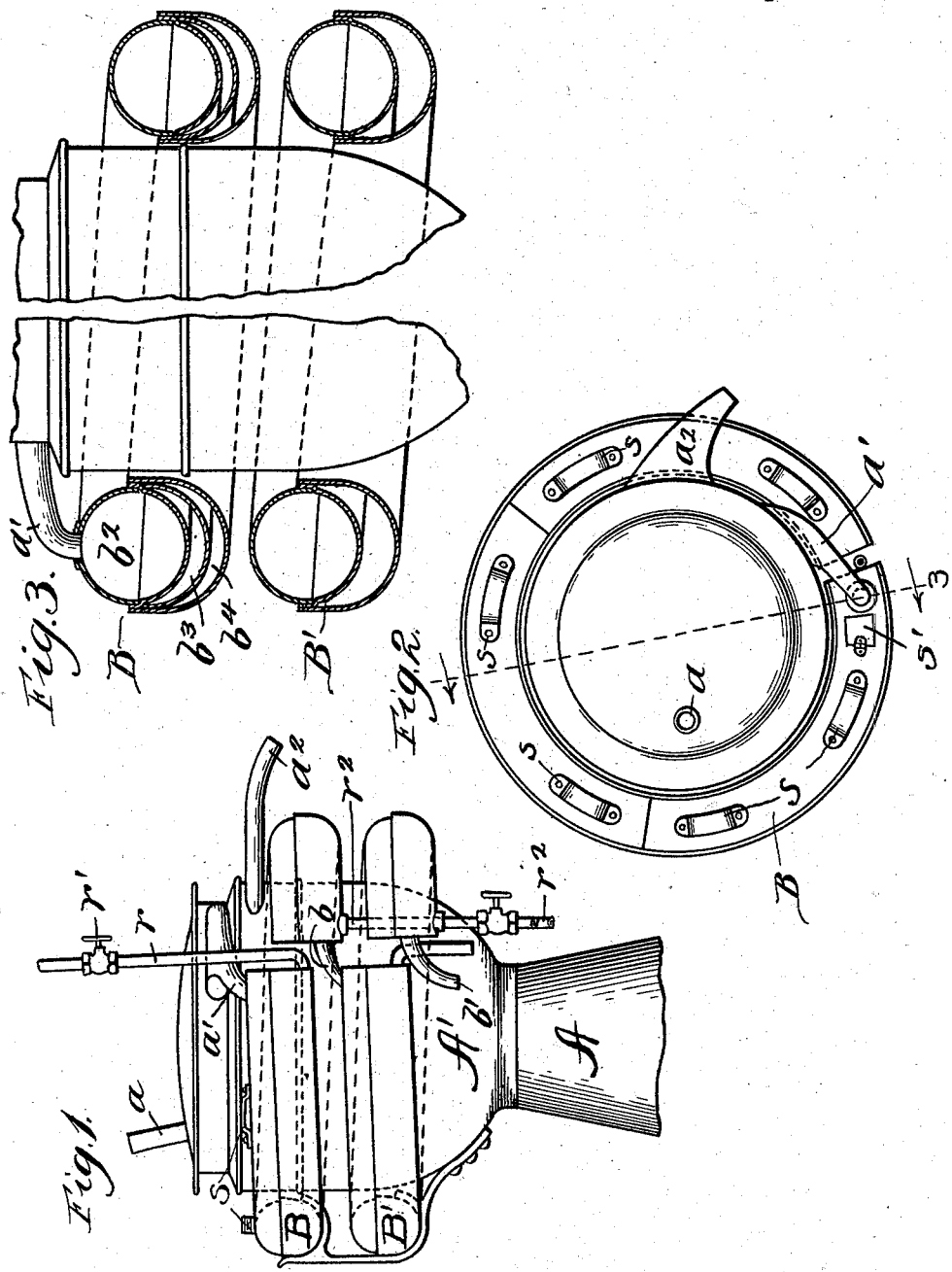
Witnesses:
Clifford N. White
Arent W. Johnson
Inventor:
Christian Bernhardt Petersen
by his attorney
Volkmar Theodor Johnson

UNITED STATES PATENT OFFICE.

CHRISTIAN BERNHARD PETERSEN, OF CHICAGO, ILLINOIS, ASSIGNOR OF ONE-HALF TO VOLKMAR THEODORE JOHNSEN, OF SAME PLACE.

APPARATUS FOR PASTEURIZING AND COOLING CREAM OR MILK.

SPECIFICATION forming part of Letters Patent No. 558,980, dated April 28, 1896.

Application filed September 30, 1895. Serial No. 564,187. (No model.)

*To all whom it may concern:*

Be it known that I, CHRISTIAN BERNHARD PETERSEN, a subject of the King of Denmark, residing in Chicago, Cook county, State of Illinois, have invented certain new and useful Improvements in Apparatus for Pasteurizing and Cooling Cream or Milk; and I hereby declare the following to be a true and full description of the invention, such as will enable others skilled in the art to which it pertains to make and use the same.

My invention relates to an improvement in an apparatus adapted to be attached to any ordinary centrifugal cream-separator, whereby the cream may be pasteurized and cooled directly as it is discharged from the separator without permitting it to come in contact with the outer atmosphere.

It is a well-known fact that cream is extremely sensitive, and that if allowed to remain exposed it will quickly absorb odors, impure matter, and odors tending to destroy the flavor and keeping qualities of butter made from such cream, while if taken fresh, heated to a certain temperature, and then suddenly cooled, it renders it, according to the theories of acknowledged authorities, to a great extent proof against such absorption.

It is therefore the object of my invention to provide a simple yet effective device or appliance adapted to be attached to an ordinary cream-separator, whereby the cream may be taken direct from the separator, discharged into a receptacle properly heated to the desired temperature, and then into a cooling-receptacle, from which it is discharged into the cases, bottles, &c., for shipment and use, and to so construct this apparatus or attachment that it may be readily attached to or detached from the separator; that it will occupy as little space as possible, and that the compartments in which the cream is worked may be quickly and effectually cleaned. I attain these objects in a manner substantially as hereinafter described and claimed.

In the drawings, Figure 1 is a side elevation of my improved apparatus attached to the outer bowl of an ordinary centrifugal cream-separator; Fig. 2, a plan view of the same; Fig. 3, a view on line 3 3 of Fig. 2, showing the pasteurizing and cooling compartments in section.

Referring to the drawings, A represents an ordinary centrifugal cream-separator, A' being the outer bowl. $a$ is the inlet for the fresh milk into the separating-bowl; $a'$, the outlet for the cream, and $a^2$ the outlet for the milk.

Encircling the outer bowl A' are two troughs B and B', both of spiral form and preferably hung or secured to the bowl A' one above the other. Into the upper trough B at its higher end enters the cream-discharge pipe $a'$, and at its lower end is a second discharge-pipe $b$, which discharges the cream from the upper or heating trough B into the lower or cooling trough B'; also at its upper end from where it is discharged, at the lower end, through pipe $b'$ into a can or other suitable storage vessel.

The trough B is made in three compartments $b^2$, $b^3$, and $b^4$, the former being for the cream and the latter for the admission of steam or other suitable heating vapor or substance. The upper half of the compartment $b^2$ is made in sections, the upper section being adapted, with the aid of handles $s$ thereon, to be removed, so that speedy and easy access may be had thereto for the purpose of cleaning, while the lower compartment $b^4$ is provided with pipe $r$, having regulating-valve $r'$ thereon, and pipe $r^2$ for the admission and discharge of the heating substance used. The central compartment $b^3$ is for the purpose of a water-jacket to prevent the burning or scalding of the cream.

The lower trough B' is made the same as the one just described, except that it has no water-jacket and that the inlet for the water or other substance used for cooling enters at the bottom and discharges at the upper end.

One section of the cover on the upper trough is provided with a peep-hole $s'$ near the cream-inlet for the purpose of watching the inlet of cream.

The operation in connection with the separator is as follows, viz: Fresh milk enters the separating-bowl through inlet $a$, where the cream is separated from the milk and discharged through outlet $a'$ into the heating-trough B, which is heated by means of steam or any other heating vapor or fluid admitted into the compartment $b^4$. The cream travels around in the trough B to the point of discharge and during its travel becomes heated to the desired temperature. It is then discharged into the cooling-trough B', cooled by the circulation of cold water or similar cooling substance. As soon as it is discharged into this trough it becomes suddenly cooled, and by the time it reaches the point of discharge from this trough it has been reduced to a low temperature. It will thus be seen that the cream is thoroughly pasteurized and cooled before coming in contact with the outer atmosphere and is therefore free from bacteria, less liable to absorb foul odors, and will produce butter of superior keeping qualities.

Having thus described my invention, what I claim is—

The combination with a centrifugal cream-separator of a circular receptacle adapted to receive cream direct from said separator said receptacle made in two main compartments with a third compartment intervening between them, means for introducing a heating vapor or substance into, and discharging it from one of said main compartments, said third compartment adapted to be used as a water-jacket to prevent burning or scalding of the cream, a second receptacle of circular form adapted to receive the cream direct from the beforementioned receptacle, said second receptacle made in two compartments one of which is adapted to receive the cream the other to receive water or other cooling substance, an outlet-conduit for the cream from said second receptacle, and both of said cream-receptacles provided with covers to admit of access to the interior thereof for the purposes of cleaning, substantially as described.

CHRISTIAN BERNHARD PETERSEN

Witnesses:
LAURENCE MAMMEN,
H. C. MADSEN.